US006961524B1

(12) United States Patent
Foo

(10) Patent No.: US 6,961,524 B1
(45) Date of Patent: Nov. 1, 2005

(54) WDM CHANNEL EQUALIZATION IN ADD/DROP-CAPABLE OPTICAL NETWORKS

(75) Inventor: Sik Heng Foo, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 683 days.

(21) Appl. No.: 09/667,680

(22) Filed: Sep. 22, 2000

(51) Int. Cl.[7] .......................... H04B 10/08; H04B 10/04
(52) U.S. Cl. ......................... 398/197; 398/26; 398/27; 398/28
(58) Field of Search ..................... 398/68, 69, 149, 398/162, 195–197, 26–28, 30, 32, 33, 38, 398/95

(56) References Cited

U.S. PATENT DOCUMENTS

| | | | |
|---|---|---|---|
| 5,225,922 A | | 7/1993 | Chraplyvy et al. ......... 359/124 |
| 6,040,933 A | * | 3/2000 | Khaleghi et al. ............... 398/1 |
| 6,115,157 A | * | 9/2000 | Barnard et al. ................. 398/1 |
| 6,134,036 A | * | 10/2000 | Andreozzi et al. ............. 398/1 |
| 6,271,945 B1 | * | 8/2001 | Terahara ..................... 398/26 |
| 6,400,479 B1 | * | 6/2002 | Zhou et al. ................... 398/92 |
| 6,643,055 B1 | * | 11/2003 | Askinger et al. ...... 359/337.12 |
| 2003/0053163 A1 | * | 3/2003 | Li et al. ..................... 359/110 |

* cited by examiner

*Primary Examiner*—M. R. Sedighian
*Assistant Examiner*—Dzung Tran
(74) *Attorney, Agent, or Firm*—Borden Ladner Gervais LLP; Jeffrey M. Measures

(57) ABSTRACT

To equalize the performance of multiple channels travelling along diverse subsets of a main optical path, a channel-specific figure of merit for each channel is determined and a site-specific figure of merit for each site which is a drop site for at least one channel is determined. The channel-specific figure of merit for a particular channel could be a figure of merit (such as OSNR, Q or BER) for that channel at the particular channel's drop site, while the site-specific figure of merit for a particular drop site may be the average figure of merit for all channels received at the particular drop site. Equalization is then achieved by adjusting the power of each channel as a function of the difference between the channel-specific figure of merit for that channel and the site-specific figure of merit for that channel's drop site. Because measurements at each channel's drop site play a role in determining the power adjustment used for that channel, the actual path taken by that channel is taken into consideration during the equalization process.

40 Claims, 13 Drawing Sheets

WDM CHANNEL EQUALIZATION IN ADD/DROP-CAPABLE OPTICAL NETWORKS

FIELD OF THE INVENTION

The present invention relates generally to wavelength division multiplexed (WDM) optical networks having add and drop capability and, more particularly, to performance equalization of channels travelling along diverse subsets of a main optical path in such a network.

BACKGROUND OF THE INVENTION

In a traditional wavelength division multiplexed (WDM) network, individual traffic channels are carried by distinct wavelengths of light that travel together along a single optical fiber for considerable distances until some of the channels are switched at a switching node. In order to provide the requisite switching functionality, a switching node is typically designed to convert incoming optical signals to electrical signals, to decode the contents of the electrical signals, to regenerate the electrical signals, to switch the regenerated electrical signals in accordance with a connection map, and then to re-convert the switched electrical signals back into optical signals. For this reason, switching nodes are expensive and are typically only located at a limited number of strategic points in the network.

As a result, traditional networks often contain long fiber segments shared by the same group of channels, with no possibility of diverting individual channels from the group or coupling additional channels to the group until a switching node is reached. However, it is sometimes highly desirable to divert an individual channel from the group or to couple an additional channel to the group before a switching node is reached. To this end, the art has seen the development of the optical add/drop multiplexer (OADM). This component makes it possible to add channels to (and drop channels from) a "main" optical path existing along a network segment which might otherwise not have access to switching functionality in a traditional network. An especially advantageous feature of OADMs is that channels can be added and dropped without the need to perform electro-optical or opto-electronic signal conversion.

However, the widespread use of OADMs along a main optical path comes at a price. Specifically, because optical amplifiers along the main optical path have a gain that varies with wavelength and because the fiber itself has an attenuation which varies with both path length and wavelength, the variety among the different paths taken by different channels will cause each channel to experience a different degree of performance degradation. As a result, the optical signal to noise ratio (OSNR) and bit error ratio (BER) of a given channel at its end point will vary widely from one channel to another, which is an unacceptable condition from a network provider's point of view.

Moreover, the use of OADMs at arbitrary points along a main optical path also degrades the performance of in-service channels due to "traffic hits" caused by the sudden addition of a channel to the main optical path.

Clearly, therefore, it would be desirable to be able to equalize the performance of each channel travelling along its own distinct portion of a main optical path. However, despite the availability of techniques for equalizing multiple channels that share the same end-to-end route between two switching nodes, the industry still lacks a technique to equalize multiple channels that travel along diverse subsets of a main optical path.

SUMMARY OF THE INVENTION

The present invention equalizes the performance of multiple channels travelling along diverse subsets of a main optical path. This can be achieved by first determining a channel-specific figure of merit for each channel and determining a site-specific figure of merit for each drop site. For example, the channel-specific figure of merit for a particular channel could be a figure of merit for the particular channel at the particular channel's drop site, while the site-specific figure of merit for a particular drop site may be a function of the figures of merit for all channels received at the particular drop site. Equalization is then achieved by adjusting the power of each channel as a function of the channel-specific figure of merit for that channel and as a function of the site-specific figure of merit for that channel's drop site.

Because measurements at each channel's drop site play a role in determining the power adjustment used for that channel, the actual path taken by that channel is taken into consideration during the equalization process.

Therefore, according to a first broad aspect, the invention may be summarized as a method of carrying out performance equalization of a plurality of channels, wherein each channel travels through the network from one of the sites, called an "add" site for that channel, to another one of the sites, called a "drop" site for that channel. The method includes determining a channel-specific figure of merit for each channel; determining a site-specific figure of merit for each site that is a drop site for at least one channel; and adjusting a transmit power of each channel as a function of the channel-specific figure of merit for that channel and as a function of the site-specific figure of merit for that channel's drop site.

According to a second broad aspect, the invention may be summarized as a method of generating power adjustments used to control the transmit power of a plurality of channels, wherein each channel travels from a corresponding "add" site to a corresponding "drop" site in a WDM optical network, wherein each channel from among the set of channels either dropped at or travelling through a site occupies a distinct wavelength of light. The method includes receiving a wavelength-specific figure of merit for each wavelength at each site; determining a channel-specific figure of merit for each channel from the wavelength-specific figures of merit for those wavelength/site combinations corresponding to that channel; determining a site-specific figure of merit for each site that is a drop site for at least one channel from the wavelength-specific figures of merit associated with that channel's path; and generating the power adjustment for each channel as a function of the channel-specific figure of merit for that channel and as a function of the site-specific figure of merit for that channel's drop site.

The invention may be summarized according to other broad aspects as an equalizer for performing the above methods, computer-readable media tangibly embodying a program of instructions executable by a computer to perform the above methods and at least one computer programmed to execute the above methods.

According to still another broad aspect, the invention may be summarized as a method of generating power adjustments used to control the transmit power of a plurality of channels, wherein each channel travels from a corresponding "add" site to a corresponding "drop" site in a WDM optical network, wherein each channel from among the set of channels either dropped at or travelling through a site occupies a distinct wavelength of light. The method includes, for each site which is a drop site for at least one channel, receiving a channel-specific figure of merit for each channel dropped at that drop site; determining, for each site that is a drop site for at least one channel, a site-specific figure of merit from the channel-specific figures of merit for all channels dropped at that drop site; and generating each channel's power adjustment as a function of the channel-specific figure of merit for that channel and as a function of the site-specific figure of merit for that channel's drop site.

According to yet another broad aspect, the invention may be summarized as an optical system, including a main optical path and an equalizer. The main optical path includes a plurality of sites for carrying a plurality of channels therealong, each channel travelling from a corresponding one of the sites, known as an "add" site for that channel, to a corresponding other one of the sites, known as a "drop" site for that channel, wherein each site which is a drop site for at least one channel has a capability to determine a wavelength-specific figure of merit for each channel either dropped at or passing through that site, wherein each site which is an add site for at least one channel has a capability to control the transmit power of each channel for which it is an add site.

The equalizer is connected to each site which is an add site for at least one channel and to each site which is a drop site for at least one channel and is adapted to receive a wavelength-specific figure of merit for each wavelength at each site; to determine a channel-specific figure of merit for each channel from the wavelength-specific figures of merit for those wavelength/site combinations corresponding to that channel; to determine a site-specific figure of merit for each site that is a drop site for at least one channel from the wavelength-specific figures of merit associated with that channel's path; and to generate the power adjustment for each channel as a function of the channel-specific figure of merit for that channel and as a function of the site-specific figure of merit for that channel's drop site.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings, in which.

DETAILED DESCRIPTION OF THE PREFERRED EMBODIMENTS

Figure 1:
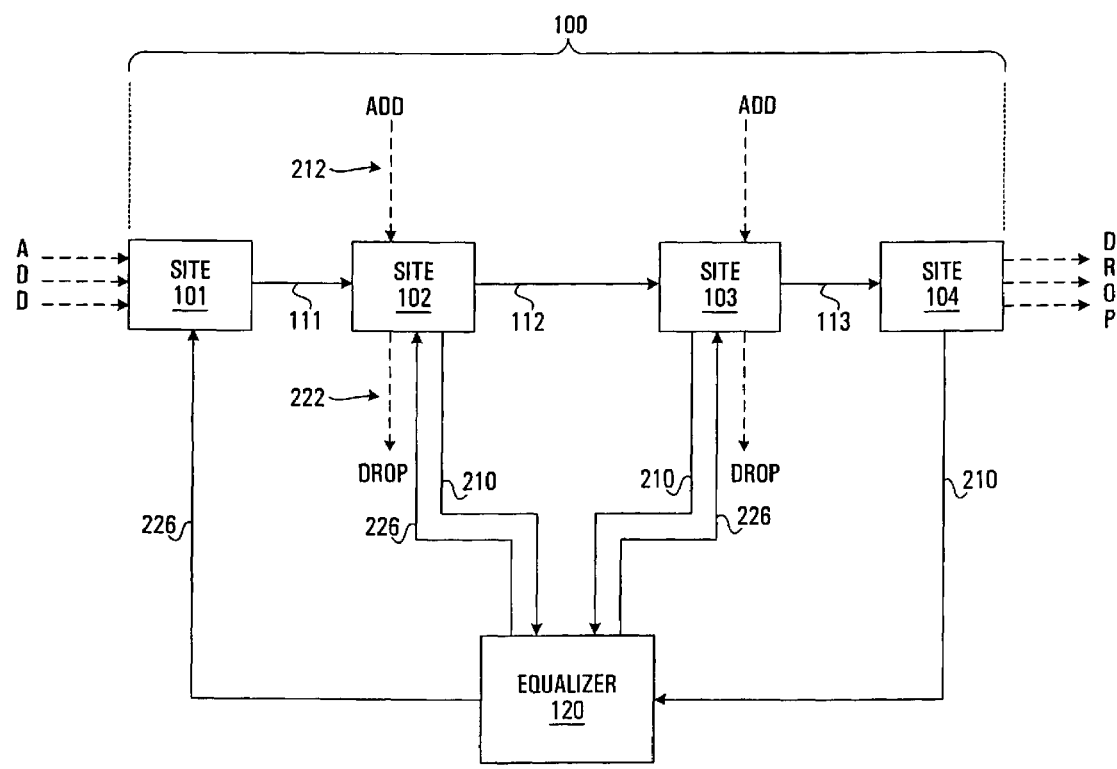
FIG. 1 shows an example transport system comprising a main optical path and an equalizer.

With reference to FIG. 1, there is shown an optical transport system comprising a plurality of sites 101, 102, 103, 104 connected to an equalizer 120. The plurality of sites 101–104 establish a main optical path 100. Site 101 is connected by a main optical fiber 111 to site 102, site 102 is connected by a main optical fiber 112 to site 103 and site 103 is connected by a main optical fiber 113 to site 104.

Site 101 is equipped with the capability to add channels to the main optical path 100, sites 102 and 103 are equipped with the capability to add channels to and drop channels from the main optical path 100 and site 104 is equipped with the capability to drop channels from the main optical path 100. Thus, site 101 may be referred to as an ingress site, site 104 may be referred to as an egress site and sites 102 and 103 may be referred to as optical add/drop multiplexer (OADM) sites.

The main optical fibers 111, 112, 113 are each capable of supporting multiple individual optical wavelengths, each of which may unoccupied or may be occupied by a channel. In the interest of simplicity, it will be assumed that a maximum of 8 wavelengths can be supported by each of the main optical fibers 111, 112, 113, although it is to be understood that any wavelength density is within the scope of the invention.

The equalizer 120 may be external to all of the sites 101–104 (as illustrated in FIG. 1). Alternatively, the equalizer 120 may be located at a particular one of the sites 101–104 or it may be distributed among the sites 101–104. The equalizer 120 can be a general purpose computer, a microprocessor, a digital signal processor or a programmable read-only memory, for example. The equalizer 120 executes a sequence of instructions which are stored in a memory to which the equalizer has access either internally or externally. The sequence of instructions represents an equalization algorithm which is used to control the transmit power of channels sent along the main optical path 100.

For clarity, the term "channel" used herein signifies an electrical signal or message which is carried in optical form from a site where the channel is added to the main optical path 100 (the channel's "add" site) to a site where that channel is dropped from the main optical path 100 (the channel's "drop" site) via one or more intermediate sites.

As a channel travels along a main optical fiber between two adjacent sites, it occupies a single wavelength of light. Thus, a channel travelling along a series of main optical fibers may occupy a different wavelength of light each time it moves from one site to the next. However, in the interest of simplicity, a channel will be assumed to occupy the same wavelength of light as it travels from its add site to its drop site, although it should be appreciated that the scope of the invention is not limited by this assumption.

Figure 5:
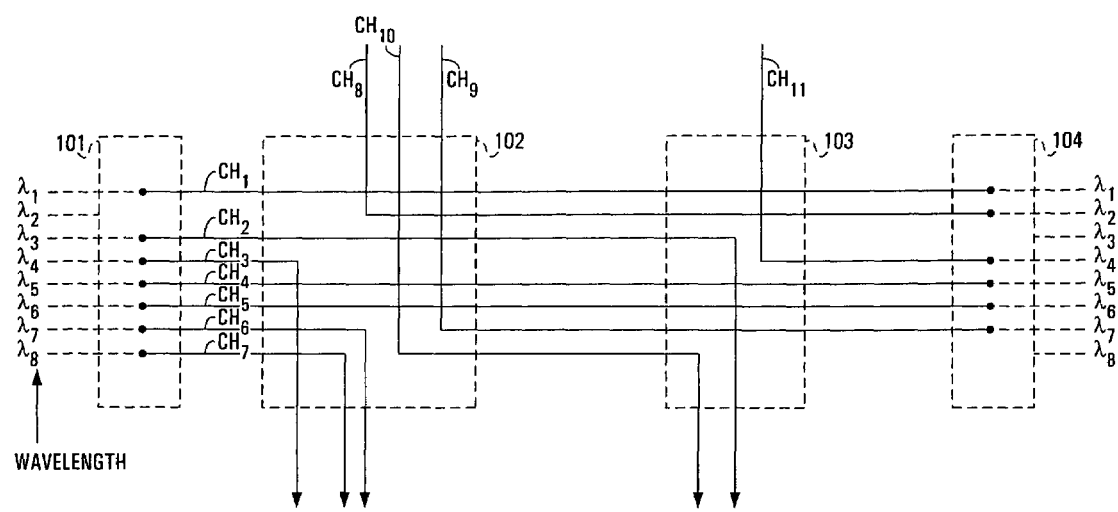
FIG. 5 conceptually illustrates a specific channel map for the transport system of FIG. 1.

Reference is now made to FIG. 5, which illustrates, at a conceptual level, one possible scenario for the flow of channels in the optical system of FIG. 1. Each main optical fiber can accommodate up to 8 wavelengths, denoted $\lambda_1$ through $\lambda_8$. Depending on the channel flow, some of these wavelengths at some sites will carry channels and others will not.

In the specific example of FIG. 5, site 101 transmits channel $CH_1$ on wavelength $\lambda_1$, no channel on wavelength $\lambda_2$ and channels $CH_2$ through $CH_7$ on wavelengths $\lambda_3$ through $\lambda_8$, respectively. These channels are all received at site 102, which drops channels $CH_3$, $CH_6$ and $CH_7$ from the main optical path 100. Site 102 then adds channels $CH_8$, $CH_9$ and $CH_{10}$ to the main optical path on wavelengths $\lambda_2$, $\lambda_7$ and $\lambda_8$. Finally, site 103 drops channels $CH_2$ and $CH_{10}$ and adds channel $CH_{11}$ on wavelength $\lambda_4$.

The channel flow characteristics of the main optical path 100 can be represented in a convenient manner by means of a "channel vector" associated with each site (in this case sites 102, 103 and 104) that has the capability to drop channels. The notation hereinafter used to represent the channels occupying the N wavelengths on a main optical fiber received at a particular site "X" is the N-vector $V_X$ with components $V_X(1), \ldots, V_X(N)$. Thus, channel vectors $V_{102}$, $V_{103}$ and $V_{104}$ are 8-vectors that specify the channels received via the main optical path at each of sites 102, 103 and 104. Using the channel flow diagram of FIG. 5 as a basis, the channel vectors would take on the following values:
$V_{102}=[CH_1 \text{ --- } CH_2\ CH_3\ CH_4\ CH_5\ CH_6\ CH_7]$
$V_{103}=[CH_1\ CH_8\ CH_2 \text{ --- } CH_4\ CH_5\ CH_9\ CH_{10}]$
$V_{104}=[CH_1\ CH_8 \text{ --- } CH_{11}\ CH_4\ CH_5\ CH_9 \text{ --- }]$.

Considering the above three vectors in conjunction with the channel flow scenario of FIG. 5, it is apparent that site 102 receives channel $CH_1$ on wavelength $\lambda_1$, receives no channel on wavelength $\lambda_2$ and receives channels $CH_2$ through $CH_7$ on wavelengths $\lambda_3$ through $\lambda_8$, respectively. Among these, channels $CH_3$, $CH_6$ and $CH_7$ are dropped from the main optical path 100 by site 102 and channels $CH_8$, $CH_9$ and $CH_{10}$ on wavelengths $\lambda_2$, $\lambda_7$ and $\lambda_8$ are transmitted to site 103 along with channels $CH_1$, $CH_2$, $CH_4$ and $CH_5$ which have not been dropped. Finally, site 103 drops channels $CH_2$ and $CH_{10}$ and adds channel $CH_{11}$ on wavelength $\lambda_4$ which is then transmitted to site 104 along with channels $CH_1$, $CH_8$, $CH_4$, $CH_5$ and $CH_9$.

Figure 7:
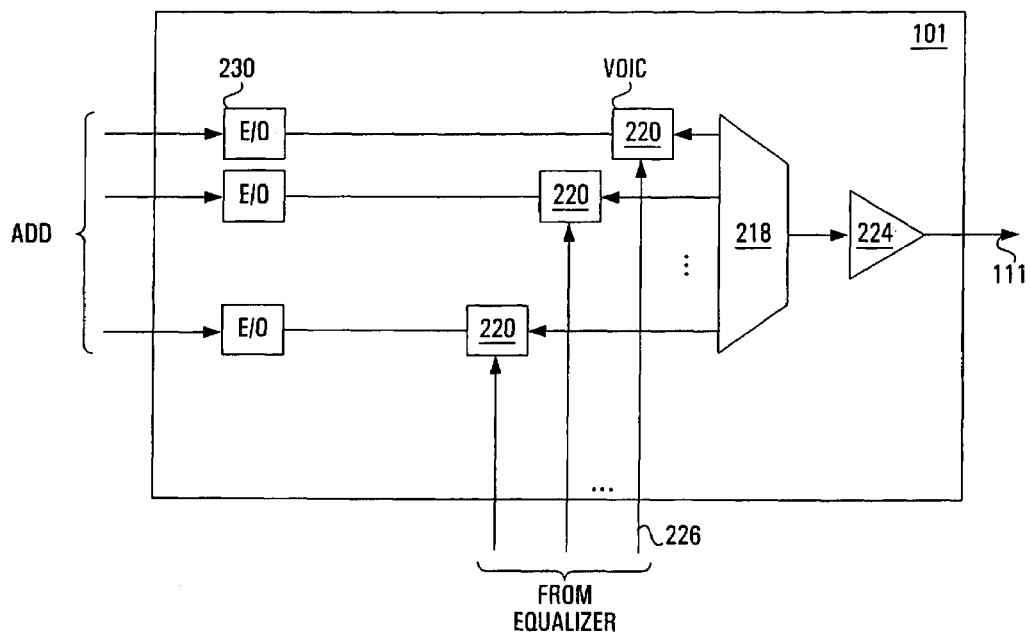
FIG. 7 is a block diagram of an ingress site, in accordance with an embodiment of the present invention.

With reference now to FIG. 7, there is shown an ingress site (such as site 101) in block diagram form. By definition, the ingress site can act as an add site for one or more channels. The ingress site comprises a plurality of electro-optical converters 230, one for each of a plurality of channels which are to be added to the main signal path 100 on main optical fiber 111. Each of the electro-optical converters 230 can be of standard design and operates at a distinct wavelength of light. Alternatively, each of the electro-optical converters 230 may function at a common wavelength, in which case each electro-optical converter 230 could be followed by a wavelength conversion device (not shown) for transferring the resulting optical signal to the appropriate wavelength.

The optical signals on different wavelengths (whether emitted directly by the electro-optical converters 230 or arriving via intervening wavelength conversion devices) then pass through a respective set of variable optical intensity converters (VOICs) 220 before being multiplexed into a single WDM optical signal by a standard optical multiplexer 218. The optical multiplexer 218 serves to passively combine intensity-controlled optical signals emerging from the VOICs 220 into a single WDM optical signal. This WDM optical signal appearing at an output of the multiplexer 218 is fed to a multi-wavelength optical amplifier 224 having an output connected to main optical fiber 111.

Each VOIC 220 may be of standard design and comprises optical and/or electronic circuitry for adjusting the transmit power of the respective optical signal in accordance with a respective electronic control signal received along a respective one of a plurality of control lines 226. The control lines 226 lead from the equalizer 120 which sets the values of the signals carried by each control line. In another embodiment, the control lines 226 could share a common data bus with the equalizer 120.

Figure 2A:
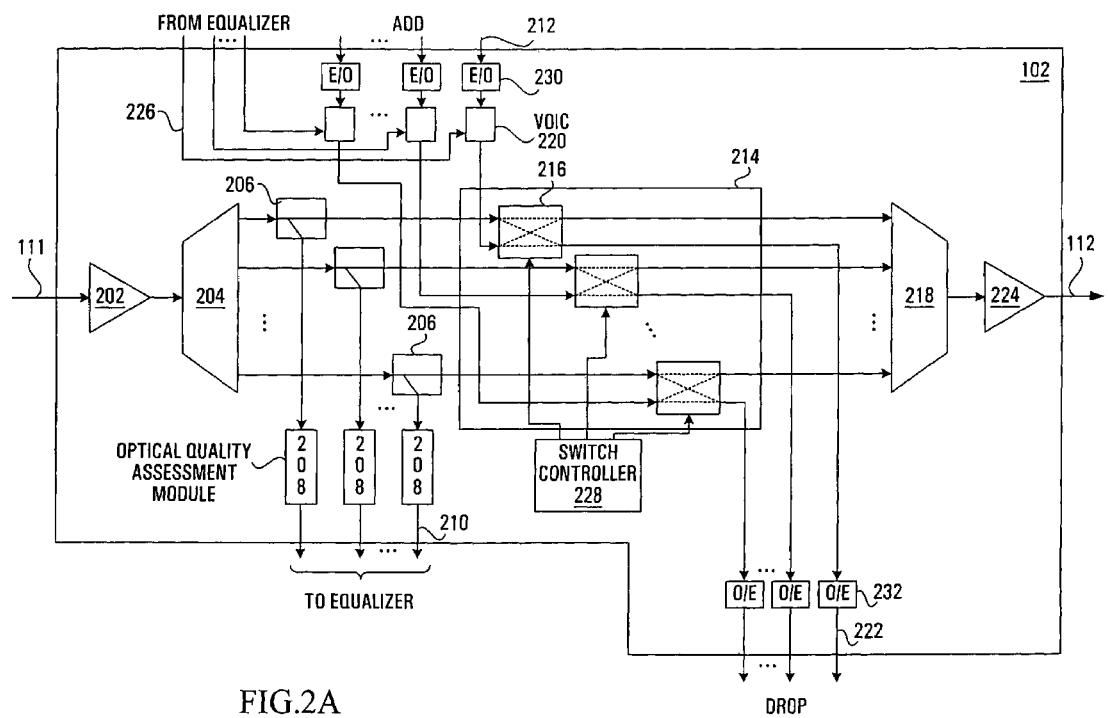
FIG. 2A is a block diagram of one suitable embodiment of an OADM site.

With reference now to FIG. 2A, there is shown a block diagram of OADM site 102 in which some components can be similar or identical to those used in site 101 and are thus given like numerals. By definition, the OADM site 102 can act as an add site for one or more channels and as a drop site for one or more other channels. Site 102 receives a WDM optical signal along main optical fiber 111. An amplifier 202 may be provided for amplification of the incoming WDM optical signal.

Also provided is an optical demultiplexer 204 connected to the amplifier 202, for separating the incoming WDM optical signal into its single-wavelength components. Individual optical splitters 206 are connected to the outputs of the demultiplexer 204 and each is used for diverting a fraction of the corresponding single-wavelength optical signal towards a respective optical quality assessment module 208.

Relatively weak signals diverted from the main optical path by the splitters 206 are used by the optical quality assessment modules 208 to estimate a figure of merit of the signals received by site 102 along main optical fiber 111. In one embodiment of the invention, a suitable figure of merit is one which is measurable in the optical domain and does not require a full power signal, an example being the optical signal-to-noise ratio (OSNR). Each optical quality assessment module 208 thus comprises suitable circuitry, control logic and/or software for measuring the OSNR of the channel whose signal is diverted by the corresponding splitter 206. Optical quality assessment modules for measuring the OSNR of an optical signal are well known in the art and need not be described here in detail.

The optical quality assessment modules 208 thus output the OSNR for the signal on each wavelength. Some of these wavelengths will be occupied by channels and some may not. In the illustrated embodiment, the OSNR values are provided to the equalizer 120 along respective ones of a plurality of control lines 210. In other embodiments, the outputs of the optical quality assessment modules 208 could be connected to a data bus that is shared with the equalizer 120.

Site 102 also receives additional channels along one or more add links 212. These additional channels are to be converted into optical signals and added to the main optical path 100. To this end, there is provided a plurality of electro-optical converters 230, each of which converts a respective one of the additional channels into a single-wavelength optical signal representing a channel. The output of each electro-optical converter 230 is connected to a respective one of a plurality of variable optical intensity controllers (VOICs) 220.

The VOICs 220 are used for controlling the transmit power of each channel-carrying optical signal being added to the main optical path 100. Control of the transmit power of the single-wavelength optical signal passing through a particular VOIC 220 is provided by a control signal received from the equalizer 120 along a respective control line 226. Alternatively, the control lines 226 and the equalizer 120 may be linked together via a common data bus.

The totality of single-wavelength optical signals (including those received from the demultiplexer 204 via the splitters 206 and those received from the electro-optical converters 230 via the VOICs 220) are fed to an optical add/drop module 214. Any of a wide variety of formats for the add/drop module 214 are within the scope of the invention. For instance, the add/drop module 214 may comprise a plurality of 2×2 optical switches 216, one for each of the optical single-wavelength signals received from the demultiplexer 204. Each 2×2 switch 216 has two inputs and two outputs. One of the two inputs is one of the single-wavelength optical signals received from the demultiplexer 204. The other one of the inputs is one of the single-wavelength optical signals received from one of the electro-optical converters 230.

Each 2×2 switch 216 also has two outputs. One of the outputs is connected to an input of a multiplexer 218 and the other one of the outputs is connected to a drop link (or in this case, to one of a plurality of drop links 222) via a respective opto-electronic converter 232. The multiplexer 218 is adapted to passively combine the received single-wavelength optical signals into a single WDM optical signal which is amplified by an amplifier 224 prior to being transmitted to site 103 along main optical fiber 112.

Each 2×2 switch 216 is equipped with hardware for controllably executing either a "straight-through" or "cross-over" mapping between its pair of inputs and its pair of outputs. For the straight-through mapping, the single-wavelength optical signal received from the demultiplexer 204 continues along the main optical path, whereas for the cross-over mapping, the single-wavelength optical signal received from the demultiplexer 204 is dropped and it is the single-wavelength optical signal received from one of the electro-optical converters 230 which proceeds onwards along the main optical path.

The mapping executed by each 2×2 switch 216 is controlled by a switch controller 228. Thus, the switch controller 228 can either (1) allow received channels which occupy wavelengths carried on main optical fiber 111 to proceed along main optical fiber 112; or (2) drop any of the received channels; or (3) drop some of the received channels while sending new channels along the main optical path on unoccupied wavelengths or on wavelengths formerly occupied by the dropped channels. The switch controller 228 can be a micro-processor which changes the applied mappings in a pre-programmed way or in response to external stimuli.

Figure 2B:
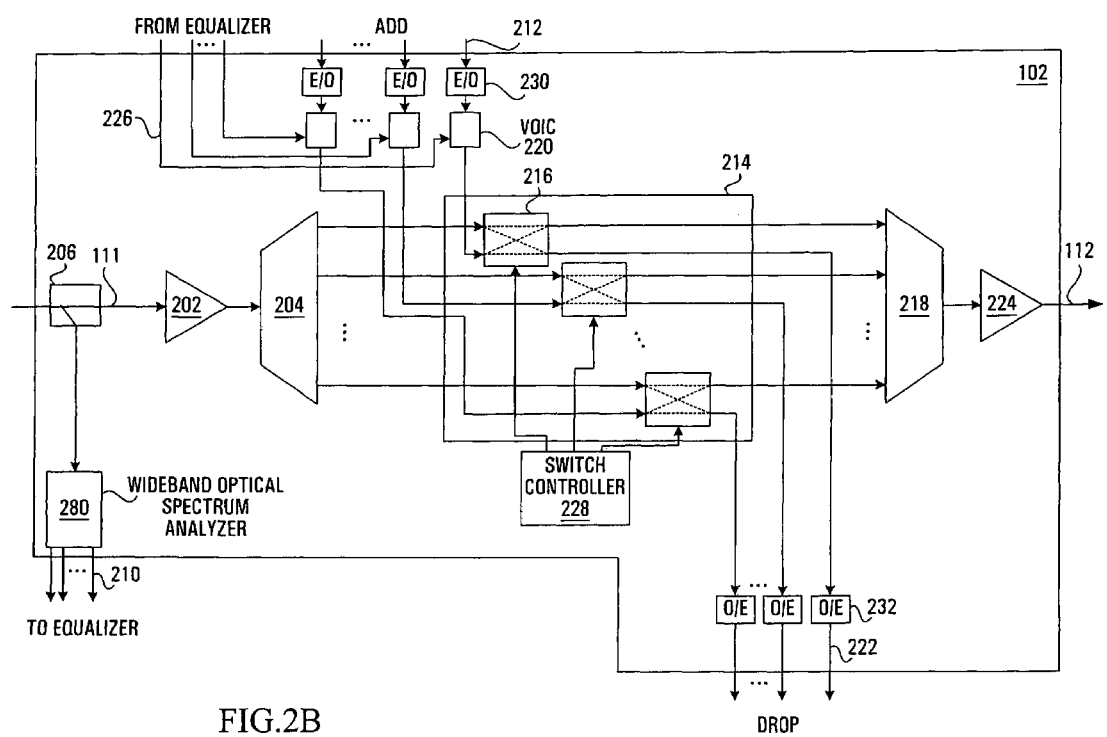
FIG. 2B is a variation of the embodiment of FIG. 2A.

Of course, variations of site 102 are possible. For example, as shown in FIG. 2B, it may prove more economical in some cases to position a single optical splitter 206 at the input to the amplifier 202. The output of the optical splitter 206 could then be fed to a wideband optical spectrum analyzer 280, which is equipped with additional processing power in order to produce estimates of the OSNR (or any suitable optically measurable figure of merit) for each wavelength passing through the splitter 206.

It should be understood that because site 103 has the same capabilities of adding and dropping channels, its structure may be similar or identical to that just described with respect to site 102.

Figure 6A:
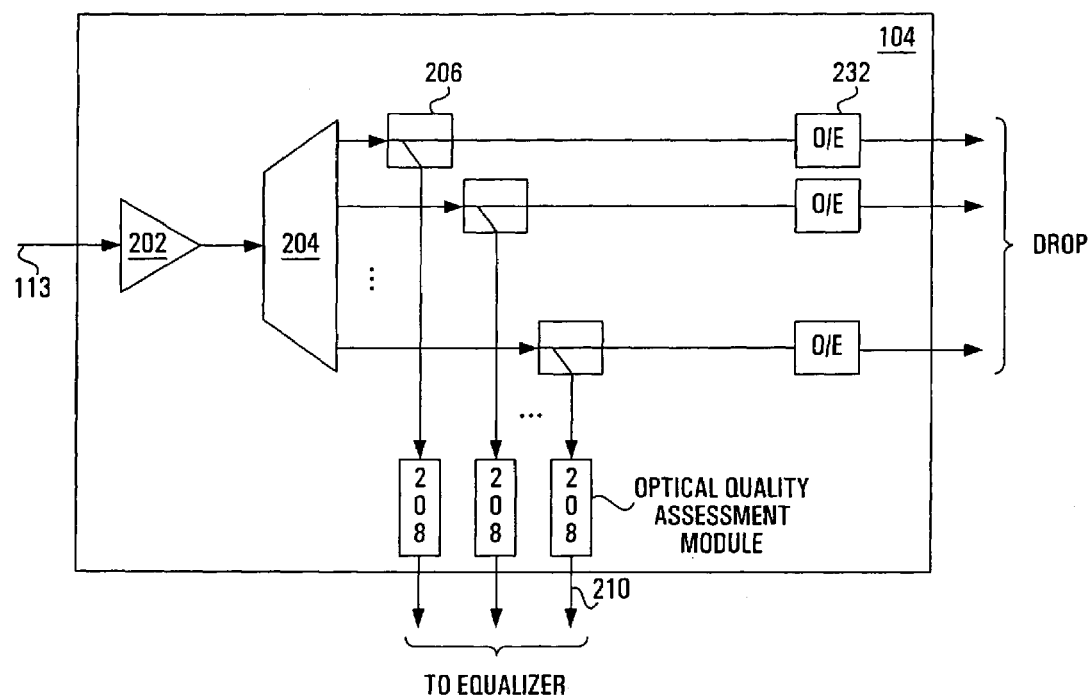
FIG. 6A is a block diagram of one suitable embodiment of an egress site.

With reference now to FIG. 6A, there is shown an egress site (such as site 104) in block diagram form. By definition, the egress site can act as a drop site for one or more channels.

The egress site 104 comprises an amplifier 202 for receiving a WDM optical signal arriving along main optical fiber 113. The amplifier 202 is connected to an optical demultiplexer 204, which separates the incoming WDM optical signal into its single-wavelength components. Each such wavelength will either be unoccupied or will be occupied by a channel. A splitter 206 is connected to each output of the demultiplexer 204.

By virtue of each splitter 206, a majority of the optical power on the corresponding wavelength passes straight through the splitter 206 towards a respective opto-electronic converter 232, while a small fraction of the optical power is diverted towards an optical quality assessment module 208.

The signals diverted from the main optical path by the splitters 206 are used by the optical quality assessment modules 208 to estimate an optical domain figure of merit (e.g., the OSNR) of the signals received by site 104 along main optical fiber 113. Each optical quality assessment module 208 can thus comprise suitable circuitry, control logic and/or software for measuring the OSNR associated with the wavelength whose signal is diverted by the corresponding splitter 206.

Each optical quality assessment module 208 provides the equalizer 120 with the OSNR for the signal on each wavelength. Some of these wavelengths will be occupied by channels and others may not. In the illustrated embodiment, the OSNR values are provided to the equalizer 120 along respective ones of a plurality of control lines 210. In other embodiments, the outputs of the optical quality assessment modules 208 could be connected to a data bus that is shared with the equalizer 120.

Figure 6B:
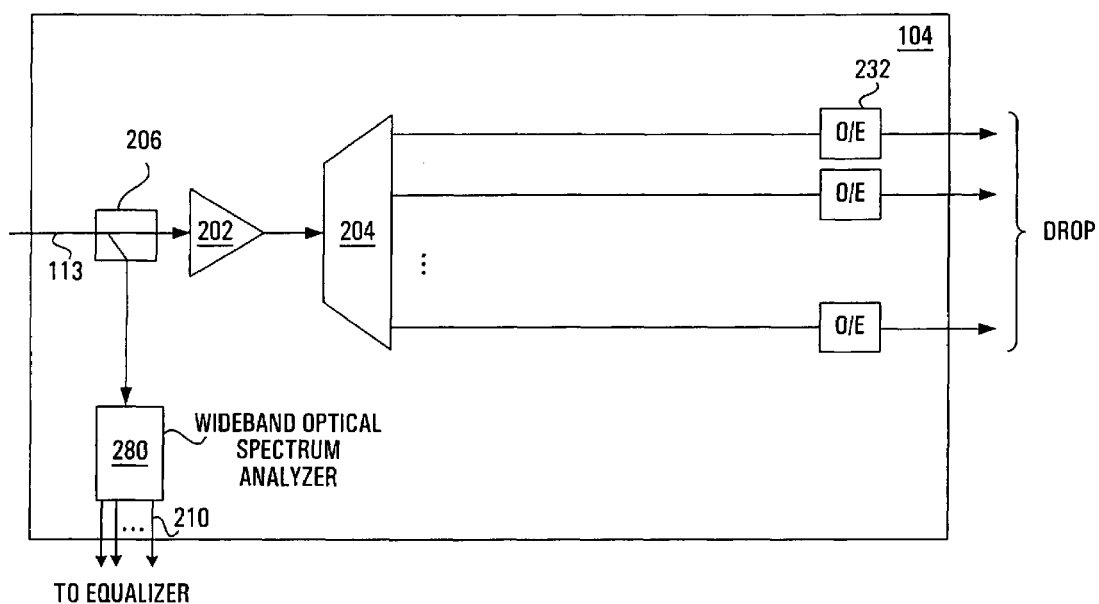
FIG. 6B is a variation of the embodiment of FIG. 6A.

Of course, variations of site 104 are possible. For example, as shown in FIG. 6B, it may prove more economical in some cases to position a single optical splitter 206 at the input to the amplifier 202. The output of the optical splitter 206 could then be fed to a wideband optical spectrum analyzer 280, which is equipped with additional processing power in order to produce estimates of the OSNR (or any suitable optically measurable figure of merit) for each wavelength passing through the splitter 206.

The channel vector notation introduced earlier on is useful for understanding the equalization algorithm run by the equalizer 120. Basically, the equalization algorithm strives to keep the range of OSNR of the various channel-carrying wavelengths at each site within a certain range. Thus, under steady state conditions, there will be little need for equalization. However, transients such as the addition of a channel to the main optical path 100 may cause a variance in the OSNR of other channels (known as an "in-service hit") and will therefore require the equalization algorithm to take effect.

Figure 3:
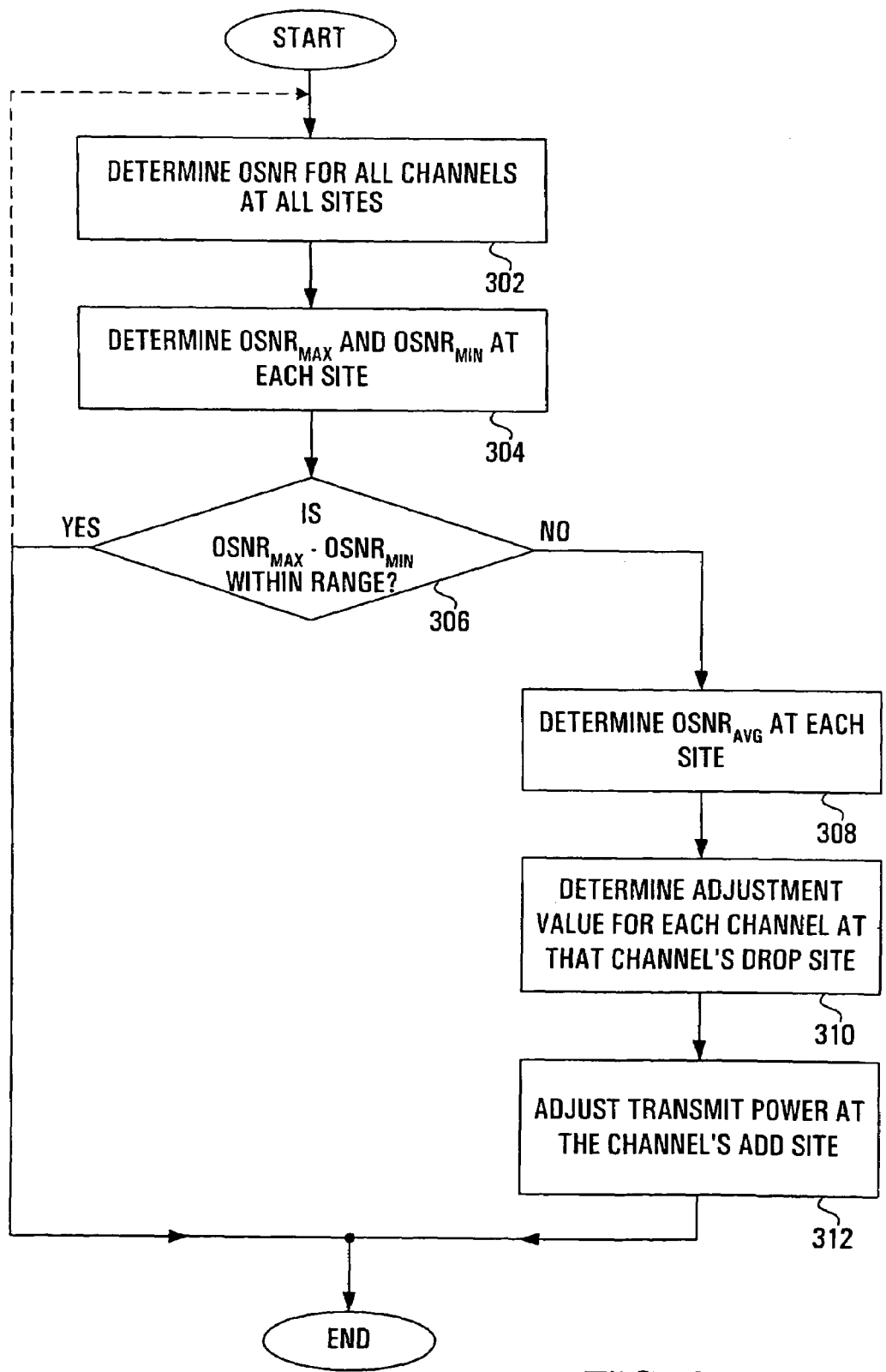
FIG. 3 is a flowchart illustrating the logical steps in an equalization algorithm performed by the equalizer, according to one embodiment of the present invention.

The equalization algorithm is now described in greater detail with reference to FIG. 3. The equalization algorithm may be called by the equalizer 120 on a sporadic (asynchronous) basis or it may run continuously within the equalizer 120.

Step 302

At each site, the OSNR of all 8 (or fewer) channel-containing wavelengths is measured, estimated or otherwise obtained. Using the above described channel vector notation, the OSNR for the $j^{th}$ channel at site X could be denoted $OSNR[V_X(j)]$ and its value would be measured, estimated or otherwise obtained for each X=102, 103, 104 and for each j=1, 2, ..., 8 (or a subset thereof if fewer than 8 wavelengths carry channels that are received along the main optical path by the particular site). It is seen that multiple wavelength-specific OSNR measurements will be obtained for the same channel if that channel passes through more than one site. The equalizer proceeds to STEP 304.

Step 304

The maximum and minimum OSNR are found at every site. For instance, the maximum and minimum OSNR at site X can be found by computing the maximum and minimum values of OSNR[$V_X$(j)] for each j=1, 2, . . . , 8. The maximum OSNR at site X may be denoted OSNR[max,X] and the minimum OSNR at site X may be denoted OSNR[min,X]. The equalizer proceeds to STEP 306.

Step 306

This step sets the condition for equalization, which is attained when the difference between the maximum and minimum OSNR at every site is within a certain range. In other words, STEP 306 essentially consists of comparing the difference between OSNR[max,X] and OSNR[min,X] to a threshold such as 0.75 dB at every site. (Of course, the threshold may differ from this one, depending on the operational requirements of the invention and any suitable threshold is within the scope of the invention.) If the result is above the threshold for one or more sites, equalization is required and the equalizer proceeds to STEP 308. However, if the result is below the threshold for all sites, then equalization is deemed to have been achieved and the equalizer either exits the equalization algorithm and waits for it to be called again or, if the equalization algorithm is ongoing, the equalizer may return to STEP 302.

Step 308

Since equalization will be required if this step is entered, the equalizer begins by computing a site-specific OSNR at each site, e.g., the average OSNR at every site. Letting OSNR[avg,X] denote the average OSNR at site X, this value may be computed by performing the arithmetic mean of OSNR[$V_X$(j)] for each j 1, 2, . . . , 8. Of course, a function other than the average could be used. The equalizer proceeds to STEP 310.

Step 310

This step effectively results in a decision being made as to how to bring the system into a state that is closer to satisfying the equalization condition of STEP 306. To this end, a "transmitter adjustment value" for each channel is computed. The transmitter adjustment value for channel $CH_Y$, denoted $ADJ_Y$, is based on measurements taken at that channel's drop site, denoted X*(Y). The transmitter adjustment value $ADJ_Y$ is computed as the difference between a channel-specific OSNR measurement and a site-specific OSNR measurement at site X*(Y). For instance, the transmitter adjustment value $ADJ_Y$ can be computed as the difference between OSNR[$V_X$*(y)(j)] and OSNR[avg,X*(Y)], for the one value of j which specifies the position of channel $CH_Y$ in the channel vector $V_X$*(y). In the context of the example channel flow scenario of FIG. 5, $ADJ_7$ for channel $CH_7$ could be computed as the difference between OSNR[$V_{102}$(8)] and OSNR[avg,102]. The equalizer then proceeds to STEP 312.

Step 312

The transmit power for channel $CH_Y$ is adjusted as a function of $ADJ_Y$ obtained at STEP 310. It is recalled that the transmit power for channel $CH_Y$ is controlled at that channel's add site. For example, the transmit power for channel $CH_9$ is controlled at site 102. In some embodiments, stability considerations may require that $ADJ_Y$ be kept less than a certain maximum step size. In other embodiments, granularity issues may limit the value of $ADJ_Y$ to quantized increments of 0.5 dB or 1 dB, for example. In still other embodiments, the transmitter power for channel $CH_Y$ may be adjusted by an amount whose magnitude is always fixed but whose sign depends on the sign of $ADJ_Y$. The equalizer then returns to STEP 302.

It should be apparent that the method of equalization as just described takes into account the actual path taken by each channel, which enhances the performance of optical networks with add and drop capability. For instance, when considering the case of adding a new channel at site 101 and dropping it at site 103, this new channel will start off with a very low OSNR at sites 102 and 103. The fact that there is a channel with a very low OSNR at sites 102 and 103 will cause STEP 306 to be followed by STEP 308. The average OSNR is then determined for sites 102 and 103, which will be slightly lower than its previous value but will probably not be as low as the initial OSNR of the new channel. Thus, at STEP 310, it will be found that the transmit power for the new channel needs to be increased, while the transmit power for each of the other channels may need to be decreased or increased, depending on its own OSNR and its relationship to the new average OSNR. This effectively temporarily "penalizes" the channels with higher OSNR until all channels have an OSNR which is within the desired range.

It should be noted that increasing the transmit power of the new channel has an effect on the OSNR of those channels which are not dropped at site 103 but proceed onwards to site 104. However, deleterious effects of increasing the transmit power of a new channel will be mitigated because the equalizer meanwhile monitors the OSNR deviations at site 104 and jointly strives to keep these within the desired range.

Hence it is seen that equalization can be performed without inducing traffic hits to, or otherwise disrupting, the in-service channels. This is very valuable for systems where protection switching is not available or not desirable.

In the above algorithm, it was assumed that the optical signal-to-noise ratio (OSNR) was the figure of merit used to assess whether equalization had been attained. In other embodiments of the invention, it is feasible to use the bit error ratio (BER) as an indicator of signal quality. However, accurate BER measurements for a given channel are often only obtainable at that channel's drop site and not at intermediate sites along the way. This is because the electrical signal derived from a full-power optical signal is required for measurement of the BER of a particular channel, and such a signal is only available at the channel's drop site. Thus, to use BER as the figure of merit in the example scenario of FIG. 5, the BER for channels $CH_3$, $CH_6$ and $CH_7$ would only be available at site 102, the BER for channels $CH_2$ and $CH_{10}$ would only be available at site 103 and the BER for channels $CH_1$, $CH_8$, $CH_{11}$, $CH_4$, $CH_5$ and $CH_9$ would only be available at site 104.

In many cases, the BER is so low that it would require an excessive amount of time to elapse before obtaining an accurate estimate of the BER. For instance, at a BER of $10^{-12}$ and a bit rate of 10 Gbps, the average time between errors is on the order of 100 seconds and hence it would take many hours before a reliable estimate could be obtained. In order to obtain speedier measurements of the performance of a channel at that channel's drop site, it is possible to make certain assumptions about the noise distribution on the channel and to use the so-called quality factor (or "Q") as a benchmark for performance.

Specifically, under certain standard assumptions, such as equal probability of incorrectly deciding that a "zero" was received in place of a "one" and vice versa, the Q for a voltage waveform containing distinct voltage levels representing a "zero" and a "one" may be defined as follows:

$$Q=(D-S_0)/\sigma_0=(S_1-D)/\sigma_1,$$

where $S_0$ is the mean voltage level for a "zero", $S_1$ is the mean voltage level for a "one", $\sigma_0$ is the noise power for a "zero", $\sigma_1$ is the noise power for a "one" and D is the decision threshold voltage. Under certain standard assumptions, the Q and the BER are related by the following well-known expression:

$$BER=erfc(Q/\sqrt{2}),$$

where erfc(x) is the complementary error function of "x".

Because it takes less time to measure, the Q is often used instead of the BER when evaluating the performance of a digital system.

In order to accommodate the measurement of a channel's Q, the internal structure of the sites 101–104 could be modified as now described. Specifically, FIG. 8 shows the modification to an OADM site (such as site 102) and FIG. 9 shows the modification to an egress site (such as site 104).

Figure 8:
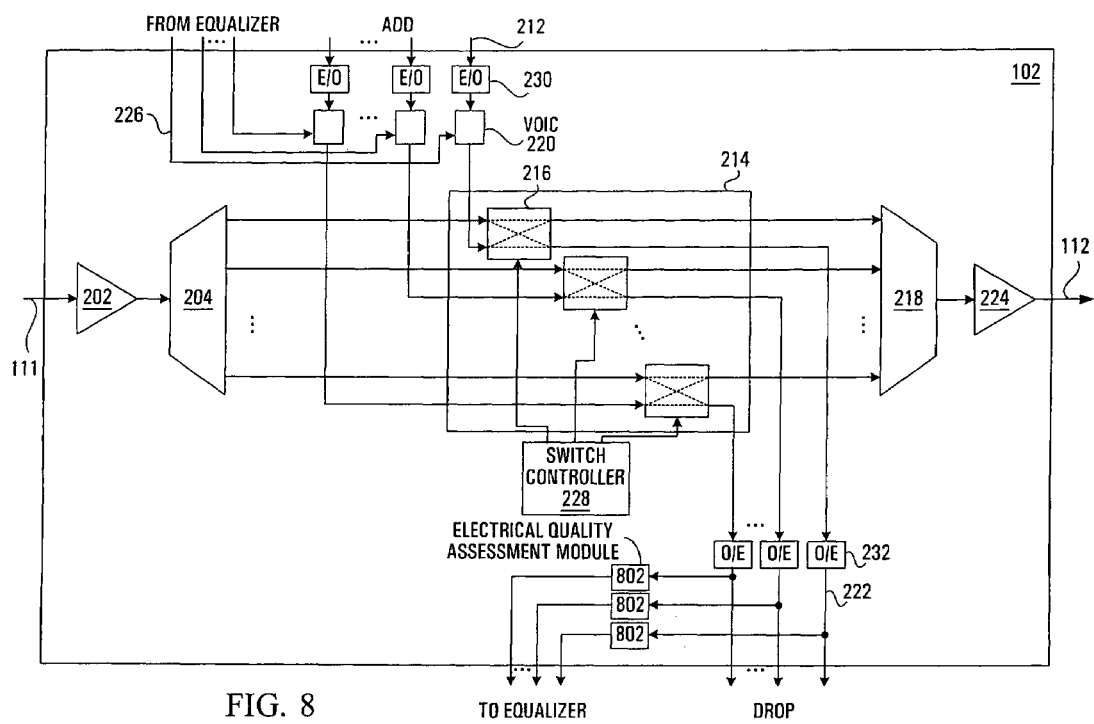
FIG. 8 is a block diagram of an OADM site, in accordance with another embodiment of the present invention.
Figure 9:
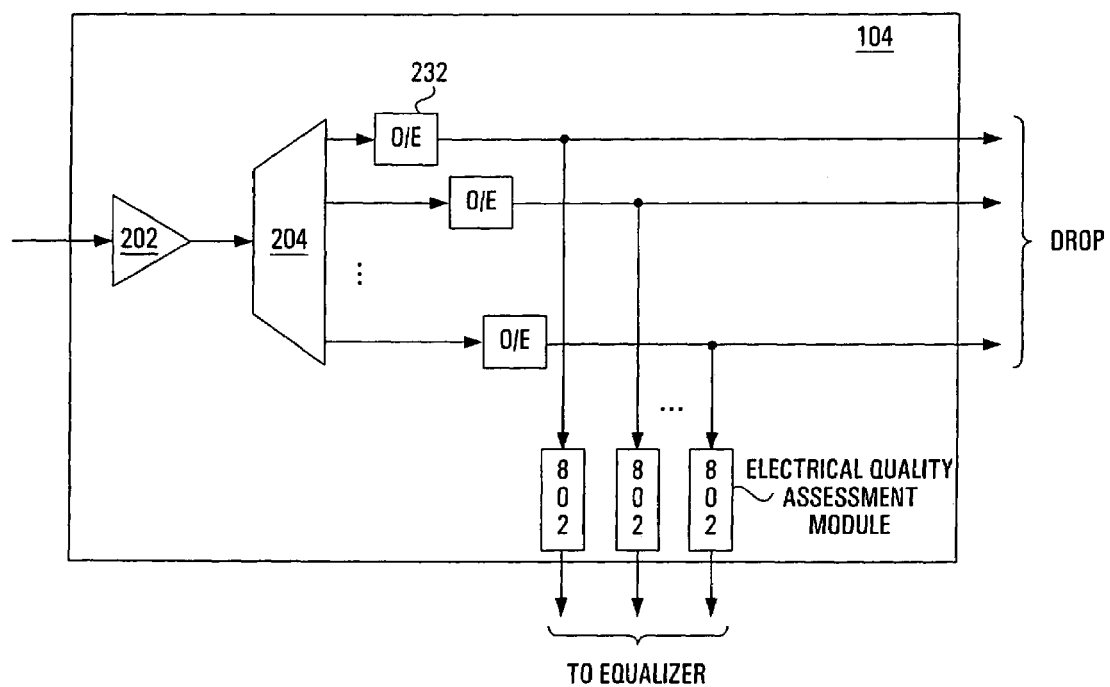
FIG. 9 is a block diagram of an ingress site, in accordance with another embodiment of the present invention.

With reference first to FIG. 8, site 102 is seen to comprise the same amplifier 202, demultiplexer 204, add/drop module 214, multiplexer 218 and amplifier 224 as in FIG. 2A. Furthermore, the additional electrical signals pass through the same electro-optical converters 230 as in FIG. 2A and the electro-optical converters 230 are connected to the VOICs 220 in the same way as in FIG. 2A. Moreover, the optical signals dropped by the add/drop module 214 similarly pass through respective opto-electronic converters 232 before leaving the site 102 along main optical fiber 112.

However, a main difference is that in the site 102 of FIG. 8, the figure of merit of those channels merely transiting through the site 102 is not measured; rather, electrical quality assessment modules 802 are used to measure a figure of merit of the dropped signals only. The input of each electrical quality assessment module 802 is tapped from the output of the respective opto-electronic converter 232. Consequently, there are no splitters intercepting the outputs of the demultiplexer 204 and the figure of merit measurements are based not on a weak optical signal but rather on an electrical signal that results from conversion of a full power optical signal.

An electrical quality assessment module 802 may comprise standard circuitry, control logic and/or software for performing analog-to-digital conversion, sampling and data processing in order to evaluate the Q or BER of the corresponding dropped signal. Suitable techniques for evaluating the Q or BER will be known to those of ordinary skill in the art.

With reference now to FIG. 9, there is shown a modified egress site 104, which is comparable to the egress site 104 previously described with reference to FIG. 6A. However, it is noted that electrical quality assessment modules 802 are used to measure a figure of merit of the dropped signals. The input of each electrical quality assessment module 802 is tapped from the output of the respective opto-electronic converter 232. Again, there are no splitters intercepting the outputs of the demultiplexer 204 and the figure of merit measurements are based on an electrical signal that resulted from conversion of a full power optical signal.

Figure 4:
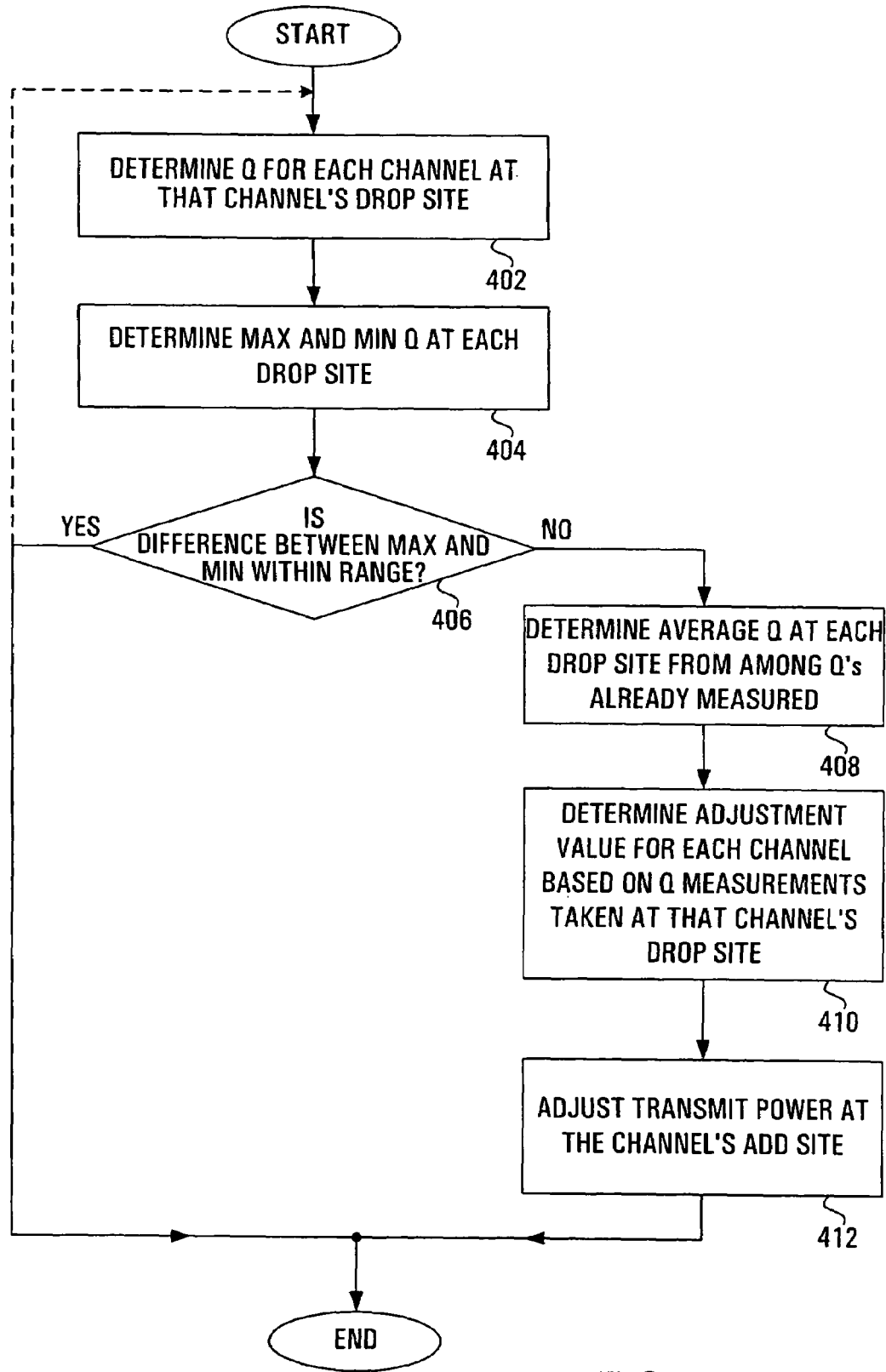
FIG. 4 is a flowchart illustrating the logical steps in an equalization algorithm performed by the equalizer, according to another embodiment of the present invention.

Reference is now made to FIG. 4, which illustrates the logical steps in an equalization algorithm that has been adapted to account for the fact that the Q for a particular channel is only available at that channel's drop site.

Step 402

The Q of each channel is measured, but only at its drop site. Letting $Q[X^*(Y)]$ denote the Q for channel $CH_Y$ at that channel's drop site $X^*(Y)$, its value would be measured, estimated or otherwise obtained for each of Y=1, 2, ..., 11 (since in this case there are 11 channels in total). The equalizer proceeds to STEP 404.

Step 404

At every site Z which is a drop site, the maximum and minimum values of $Q[X^*(Y)]$ for all channels $CH_Y$ having the drop site Z are found for that drop site. For instance, the maximum and minimum Q at drop site 104 can be found by computing the maximum and minimum values of $Q[X^*(Y)]$ for Y=1, 8, 11, 4, 5 and 9. The maximum and minimum Q at drop site Z may be denoted Q[max,Z] and Q[min,Z], respectively. The equalizer proceeds to STEP 406.

Step 406

The difference between Q[max,Z] and Q[min,Z] for each drop site Z is compared to a pre-determined threshold such as 7 (roughly corresponding to a BER of $10^{-12}$) or 8 (roughly corresponding to a BER of $10^{-15}$). Of course, other thresholds could be used and are within the scope of the invention. If the result is above the threshold for one or more values of Z (i.e., for one or more drop sites), equalization is required and the equalizer proceeds to STEP 408. However, if the result is below the threshold for all drop sites, then equalization has been achieved and the equalizer either exits the equalization algorithm and waits for it to be called again or, if the equalization algorithm is ongoing, the equalizer may return to STEP 402.

Step 408

Since equalization is required, the equalizer computes, for every drop site Z, a site-specific Q, e.g., the average among those values of Q already computed for that drop site. Letting Q[avg,Z] denote the average Q at drop site Z, its value may be computed by performing the arithmetic mean of $Q[X^*(Y)]$ for all those values of Y for which channel $CH_Y$ is dropped at drop site Z. Of course, a function other than the average could be used. The equalizer proceeds to STEP 410.

Step 410

The transmitter adjustment value for channel $CH_Y$, denoted $ADJ_Y$, is computed, based on measurements taken at the channel's drop site $X^*(Y)$. In one embodiment, $ADJ_Y$ could be computed either as the difference between $Q[X^*(Y)]$ and $Q[avg,X^*(Y)]$ or as a function of that difference. The equalizer proceeds to STEP 412.

Step 412

The transmitter power for the channel $CH_Y$ is adjusted as a function of $ADJ_Y$ obtained at STEP 410. In some embodiments, stability considerations may require that $ADJ_Y$ be kept less than a certain maximum step size. In other embodiments, granularity issues may limit the value of $ADJ_Y$ to increments of 0.5 dB or 1 dB, for example. In still other embodiments, the transmitter power for channel $CH_Y$ may be adjusted by an amount whose magnitude is always fixed but whose sign depends on the sign of $ADJ_Y$. The equalizer then returns to STEP 402.

It should be appreciated that various modifications of the above described embodiments are possible. For instance, FIG. 10A shows an embodiment of the site 102 using a different type of add/drop module 214, consisting of a chain of single-wavelength drop modules 1002 connected to a chain of single-wavelength add modules 1004.

Each drop module 1002 comprises passive optical circuitry for dropping a single channel from a received WDM optical signal. The dropped channel proceeds towards an opto-electronic converter 232 along an optical fiber 1002$_B$, while a WDM optical signal containing the remaining channels proceeds towards the next drop module 1002 (or the first add module 1004) along an optical fiber 1002$_A$.

Figure 10A:
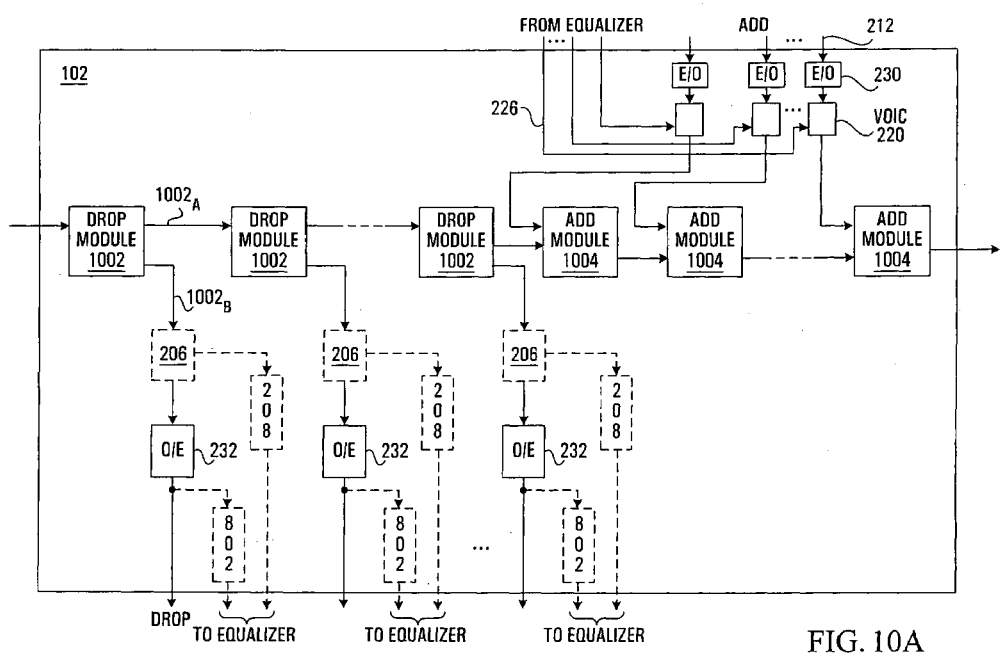
FIG. 10A is a block diagram of one suitable embodiment of an OADM site.

In the embodiment of FIG. 10A, it is only possible to determine a figure of merit of the dropped channel. This can be done optically (by means of a splitter 206 intercepting the opto-electronic converter 232 and connected to an optical quality assessment module 208) or electrically (by means of an electrical quality assessment module 802 whose input is tapped from the output of the opto-electronic converter 232). The figure of merit for each channel is supplied to the equalizer 120 by the corresponding optical or electrical quality assessment module 208, 802.

The last drop module 1002 has an output connected to the first add module 1004. The add module can be a standard optical coupler which couples an optical signal (received from a respective one of the VOICs 220) to the WDM optical signal (received from the last drop module 1002). The next add module 1004 in the chain similarly couples an optical signal received from another one of the VOICs 220 to the WDM optical signal received from the previous add module 1004.

Figure 10B:
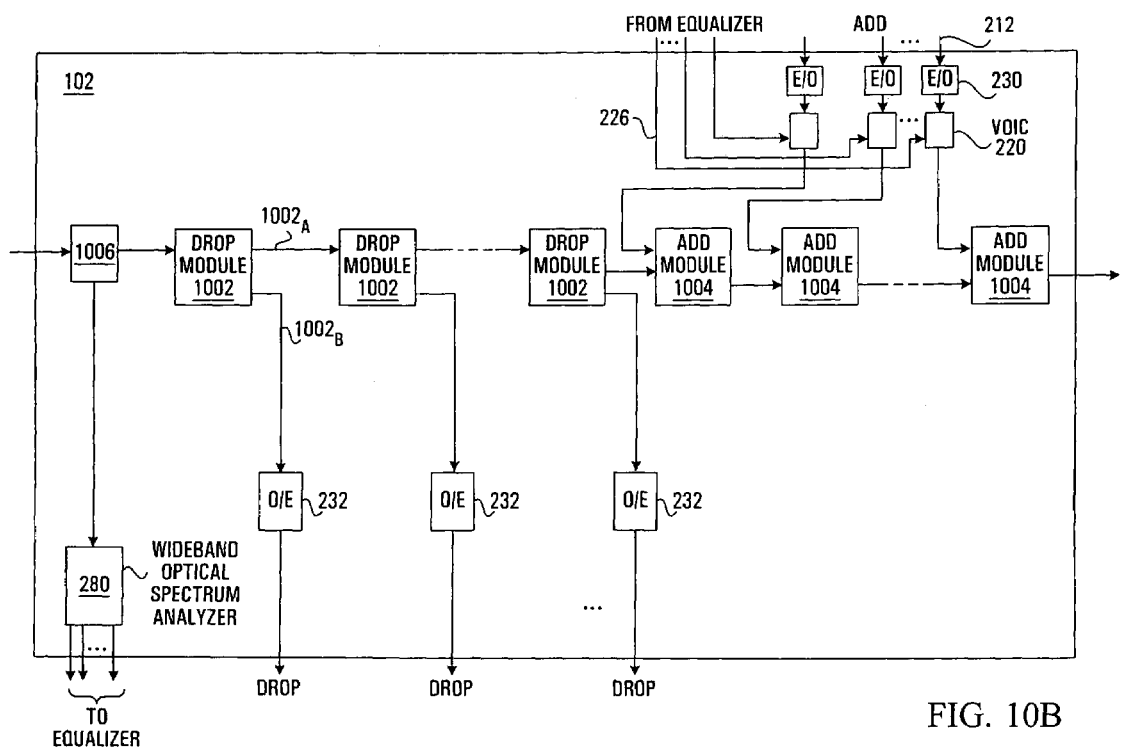
FIG. 10B is a variation of the embodiment of FIG. 10A.

Further variations of site 102 are possible, as shown in FIG. 10B, for example, where a single optical splitter 1006 is positioned at the input to the first drop module 1002. The output of the optical splitter 1006 could then be fed to a wideband optical spectrum analyzer 280, which is equipped with additional processing power in order to produce estimates of the OSNR (or any suitable optically measurable figure of merit) for each wavelength passing through the splitter 206.

In some embodiments of a VOIC, the transmit power of a channel may be controlled by varying the power of a transiting optical signal, while in other embodiments of the invention, it may be controlled by varying the pump power of a tunable laser. Still other techniques for controlling the transmit power of a channel would be known to those skilled in the art and are within the scope of the present invention. The term "variable optical intensity controller" is therefore intended to cover any technique, mechanism or device for controllably varying an optical signal's intensity (or power, because the two are linearly related).

Moreover, it should be understood that although the above description has concentrated on embodiments of the invention which use either only optical quality assessment modules 208 or only electrical quality assessment modules 802, the invention also includes in its scope embodiments which use both types of quality assessment modules. For instance, figures of merit obtained from optical quality assessment modules may be used for achieving a first order of equalization, while more precise figures of merit obtained from electrical quality assessment modules may be used for achieving a higher order of equalization.

Also, although the description has focussed on channels that are unidirectional, it should be understood that both unidirectional and bidirectional channels are within the scope of the invention.

Those skilled in the art should further appreciate that in some embodiments of the invention, all or part of the functionality previously described herein with respect to the equalizer may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the equalizer may be implemented as software consisting of a series of instructions for execution by a computer system. The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

What is claimed is:

1. In an optical network comprising a plurality of sites, a method of carrying out performance equalization of a plurality of channels, wherein each channel travels through the network from one of the sites, called an "add" site for that channel, to another one of the sites, called a "drop" site for that channel, comprising:
  a) determining a wavelength-specific figure of merit for each channel-carrying-wavelength at each one of the plurality of sites;
  b) for each respective site in the plurality of sites, determining whether the respective site has met an equalization condition on a basis of a certain threshold and the wavelength-specific figure of merit for each channel-containing wavelength at the respective site;
  c) when at least one of the sites in the plurality of sites has not met the equalization condition:
    i) determining a site-specific figure of merit for each site that is a drop site for at least one channel; and
    ii) adjusting a transmit power of each channel in the plurality of channels as a function of the wavelength-specific figure of merit for the wavelength containing that channel at that channel's drop site and as a function of the site-specific figure of merit for that channel's drop site.

2. A method as claimed in claim 1, wherein each channel from among the set of channels either dropped at or travelling through any one site occupies a distinct wavelength of light, wherein determining a site-specific figure of merit for a particular site that is a drop site for at least one channel comprises determining a wavelength-specific figure of merit for each channel dropped at the particular site and evaluating a function of each such wavelength-specific figure of merit.

3. A method as claimed in claim 2, wherein said function is an averaging function.

4. A method as claimed in claim 2, wherein said function is the arithmetic mean.

5. A method as claimed in claim 2, further comprising:
   determining, for each site that is a drop site for at least one channel, the maximum and minimum wavelength-specific figures of merit;
   wherein determining a site-specific figure of merit for each site that is a drop site for at least one channel is performed only if the difference between the maximum and minimum wavelength-specific figures of merit for at least one site that is a drop site for at least one channel is greater than a threshold.

6. A method as claimed in claim 2, wherein adjusting the transmit power of a particular channel comprises:
   comparing the wavelength-specific figure of merit for the particular channel to the site-specific figure of merit for the particular channel's drop site; and
   if the wavelength-specific figure of merit for the particular channel is less than the site-specific figure of merit for the particular channel's drop site, increasing the transmit power of the particular channel;
   if the wavelength-specific figure of merit for the particular channel is greater than the site-specific figure of merit for the particular channel's drop site, decreasing the transmit power of the particular channel.

7. A method as claimed in claim 2, wherein increasing or decreasing the transmit power of a channel is performed at that channel's add site.

8. A method as claimed in claim 2, wherein at least one of the site-specific figure of merit and the wavelength-specific figure of merit is the "Q".

9. A method as claimed in claim 2, wherein at least one of the site-specific figure of merit and the wavelength-specific figure of merit is the bit error ratio (BER).

10. A method as claimed in claim 1, wherein each channel from among the set of channels either dropped at or travelling through any one site occupies a distinct wavelength of light, wherein determining a site-specific figure of merit for a particular site that is a drop site for at least one channel comprises determining a wavelength-specific figure of merit for each channel dropped at or travelling through the particular site and evaluating a function of each such wavelength-specific figure of merit.

11. A method as claimed in claim 10, wherein said function is an averaging function.

12. A method as claimed in claim 10, wherein said function is the arithmetic mean.

13. A method as claimed in claim 10, further comprising:
   determining, for each site that is a drop site for at least one channel, the maximum and minimum wavelength-specific figures of merit;
   wherein determining a site-specific figure of merit for each site that is a drop site for at least one channel is performed only if the difference between the maximum and minimum wavelength-specific figures of merit for at least one site that is a drop site for at least one channel is greater than a threshold.

14. A method as claimed in claim 10, wherein adjusting the transmit power of a particular channel comprises:
   comparing the wavelength-specific figure of merit for the particular channel to the site-specific figure of merit for the particular channel's drop site; and
   if the wavelength-specific figure of merit for the particular channel is less than the site-specific figure of merit for the particular channel's drop site, increasing the power of the particular channel;
   if the wavelength-specific figure of merit for the particular channel is greater than the site-specific figure of merit for the particular channel's drop site, decreasing the power of the particular channel.

15. A method as claimed in claim 14, wherein increasing or decreasing the transmit power of a channel is performed at that channel's add site.

16. A method as claimed in claim 10, wherein the figure of merit is the optical signal-to-noise ratio.

17. A method as claimed in claim 1, wherein each channel from among the set of channels either dropped at or travelling through any one site occupies a distinct wavelength of light, wherein determining a wavelength-specific figure of merit for a particular channel comprises determining a figure of merit for the particular channel at the particular channel's drop site.

18. A method as claimed in claim 17, wherein determining a site-specific figure of merit for a particular site that is a drop site for at least one channel comprises determining a wavelength-specific figure of merit for each channel dropped at the particular site and evaluating a function of each such wavelength-specific figure of merit.

19. A method as claimed in claim 18, further comprising:
   determining, for each site that is a drop site for at least one channel, the maximum and minimum wavelength-specific figures of merit;
   wherein determining a site-specific figure of merit for each site that is a drop site for at least one channel is performed only if the difference between the maximum and minimum wavelength-specific figures of merit for at least one site that is a drop site for at least one channel is greater than a threshold.

20. A method as claimed in claim 18, wherein adjusting the transmit power of a particular channel comprises:
   comparing the wavelength-specific figure of merit for the particular channel to the site-specific figure of merit for the particular channel's drop site; and
   if the wavelength-specific figure of merit for the particular channel is less than the site-specific figure of merit for the particular channel's drop site, increasing the transmit power of the particular channel;
   if the wavelength-specific figure of merit for the particular channel is greater than the site-specific figure of merit for the particular channel's drop site, decreasing the transmit power of the particular channel.

21. A method as claimed in claim 18, wherein increasing or decreasing the transmit power of a channel is performed at that channel's add site.

22. A method as claimed in claim 17, wherein determining a site-specific figure of merit for a particular site that is a drop site for at least one channel comprises determining a wavelength-specific figure of merit for each channel dropped at or travelling through the particular site and evaluating a function of each such wavelength-specific figure of merit.

23. A method as claimed in claim 22, further comprising:
   determining, for each site that is a drop site for at least one channel, the maximum and minimum wavelength-specific figures of merit;
   wherein determining a site-specific figure of merit for each site that is a drop site for at least one channel is performed only if the difference between the maximum and minimum wavelength-specific figures of merit for at least one site that is a drop site for at least one channel is greater than a threshold.

24. A method as claimed in claim 22, wherein adjusting the transmit power of a particular channel comprises:

comparing the wavelength-specific figure of merit for the particular channel to the site-specific figure of merit for the particular channel's drop site; and if the wavelength-specific figure of merit for the particular channel is less than the site-specific figure of merit for the particular channel's drop site, increasing the transmit power of the particular channel;

if the wavelength-specific figure of merit for the particular channel is greater than the site-specific figure of merit for the particular channel's drop site, decreasing the transmit power of the particular channel.

25. A method as claimed in claim 22, wherein increasing or decreasing the transmit power of a particular channel is performed at the particular channel's add site.

26. A method of generating power adjustments used to control the transmit power of a plurality of channels, wherein each channel travels from a corresponding "add" site to a corresponding "drop" site in a WDM optical network comprising a plurality of sites, wherein each channel from among the set of channels either dropped at or travelling through a site occupies a distinct wavelength of light, the method comprising:

receiving a wavelength-specific figure of merit for each wavelength at each one of the plurality of site;

determining a channel-specific figure of merit for each channel from the wavelength-specific figures of merit for those wavelength/site combinations corresponding to that channel;

for each respective site in the plurality of sites, determining whether the respective site has met an equalization condition on a basis of a certain threshold and the channel-specific figure of merit for each channel at the respective site;

when at least one of the sites in the plurality of sites has not met the equalization condition:

determining a site-specific figure of merit for each site that is a drop site for at least one channel from the wavelength-specific figures of merit associated with that channel's path; and generating the power adjustment for each channel in the plurality of channels as a function of the channel-specific figure of merit for that channel at that channel's drop site and as a function of the site-specific figure of merit for that channel's drop site.

27. A method as claimed in claim 26, wherein determining a channel-specific figure of merit for each channel from the wavelength-specific figures of merit for those wavelength/site combinations corresponding to that channel comprises selecting the wavelength-specific figure of merit for the one wavelength carrying that channel at that channel's drop site.

28. A method as claimed in claim 26, wherein determining a site-specific figure of merit for a particular site that is a drop site for at least one channel from the wavelength-specific figures of merit associated with that channel's path comprises evaluating a function of the wavelength-specific figures of merit for each channel dropped at the particular site.

29. A method as claimed in claim 26, wherein determining a site-specific figure of merit for a particular site that is a drop site for at least one channel from the wavelength-specific figures of merit associated with that channel's path comprises evaluating a function of the wavelength-specific figures of merit for each channel dropped at or travelling through the particular site.

30. A method as claimed in claim 26, further comprising:

determining, for each site that is a drop site for at least one channel, the maximum and minimum wavelength-specific figures of merit;

wherein determining a site-specific figure of merit for each site that is a drop site for at least one channel is performed only if the difference between the maximum and minimum wavelength-specific figures of merit for at least one site that is a drop site for at least one channel is greater than a threshold.

31. A method as claimed in claim 26, further comprising:

for each channel, supplying that channel's power adjustment to a variable optical intensity controller at that channel's add site.

32. A method as claimed in claim 26, wherein determining the power adjustment for each channel comprises setting the power adjustment for each channel to the difference between the channel-specific figure of merit for that channel and the site-specific figure of merit for that channel's drop site.

33. A method as claimed in claim 26, wherein determining the power adjustment for each channel comprises setting the power adjustment for each channel to the lesser of a maximum increment and the difference between the channel-specific figure of merit for that channel and the site-specific figure of merit for that channel's drop site.

34. A method as claimed in claim 26, wherein determining the power adjustment for each channel comprises setting the power adjustment for each channel to a quantized approximation to the difference between the channel-specific figure of merit for that channel and the site-specific figure of merit for that channel's drop site.

35. A method as claimed in claim 26, wherein determining the power adjustment for each channel comprises setting the power adjustment for each channel to a fixed increment times the sign of the difference between the channel-specific figure of merit for that channel and the site-specific figure of merit for that channel's drop site.

36. An equalizer for generating power adjustments used to control the transmit power of a plurality of channels, wherein each channel travels from a corresponding "add" site to a corresponding "drop" site in a WDM optical network comprising a plurality of sites, wherein each channel from among the set of channels either dropped at or travelling through a site occupies a distinct wavelength of light, comprising:

means for receiving a wavelength-specific figure of merit for each wavelength at each one of the plurality of site;

means for determining a channel-specific figure of merit for each channel from the wavelength-specific figures of merit for those wavelength/site combinations corresponding to that channel;

means for determining whether each respective site in the plurality of sites has met an equalization condition on a basis of a certain threshold and the channel-specific figure of merit for each channel at the respective site;

upon detection that at least one of the sites in the plurality of sites has not met the equalization condition, said equalizer comprising:

means for determining a site-specific figure of merit for each site that is a drop site for at least one channel from the wavelength-specific figures of merit associated with that channel's path; and means for generating the power adjustment for each channel in the plurality of channels as a function of the channel-specific figure of merit for that channel at that channel's drop site and as a function of the site-specific figure of merit for that channel's drop site.

37. Computer-readable media tangibly embodying a program of instructions executable by a computer to perform a method of generating power adjustments used to control the transmit power of a plurality of channels, wherein each channel travels from a corresponding "add" site to a corresponding "drop" site in a WDM optical network comprising a plurality of sites, wherein each channel from among the set of channels either dropped at or travelling through a site occupies a distinct wavelength of light, the method comprising:

receiving a wavelength-specific figure of merit for each wavelength at each one of the plurality of sites;

determining a channel-specific figure of merit for each channel from the wavelength-specific figures of merit for those wavelength/site combinations corresponding to that channel;

for each respective site in the plurality of sites, determining whether the respective site has met an equalization condition on a basis of a certain threshold and the channel-specific figure of merit for each channel at the respective site;

when at least one of the sites in the plurality of sites has not met the equalization condition:

determining a site-specific figure of merit for each site that is a drop site for at least one channel from the wavelength-specific figures of merit associated with that channel's path; and generating the power adjustment for each channel in the plurality of channels as a function of the channel-specific figure of merit for that channel at that channel's drop site and as a function of the site-specific figure of merit for that channel's drop site.

38. At least one computer programmed to execute a process for generating power adjustments used to control the transmit power of a plurality of channels, wherein each channel travels from a corresponding "add" site to a corresponding "drop" site in a WDM optical network comprising a plurality of sites, wherein each channel from among the set of channels either dropped at or travelling through a site occupies a distinct wavelength of light, the process comprising:

receiving a wavelength-specific figure of merit for each wavelength at each one of the plurality of site;

determining a channel-specific figure of merit for each channel from the wavelength-specific figures of merit for those wavelength/site combinations corresponding to that channel;

for each respective site in the plurality of sites, determining whether the respective site has met an equalization condition on a basis of a certain threshold and the channel-specific figure of merit for each channel at the respective site;

when at least one of the sites in the plurality of sites has not met the equalization condition:

determining a site-specific figure of merit for each site that is a drop site for at least one channel from the wavelength-specific figures of merit associated with that channel's path; and generating the power adjustment for each channel in the plurality of channels as a function of the channel-specific figure of merit for that channel at that channel's drop site and as a function of the site-specific figure of merit for that channel's drop site.

39. A method of generating power adjustments used to control the transmit power of a plurality of channels, wherein each channel travels from a corresponding "add" site to a corresponding "drop" site in a WDM optical network, wherein each channel from among the set of channels either dropped at or travelling through a site occupies a distinct wavelength of light, the method comprising:

for each site which is a drop site for at least one channel, receiving a wavelength-specific figure of merit for each channel-carrying-wavelength whose channel is dropped at that drop site;

for each respective drop site, determining whether the respective drop site has met an equalization condition on a basis of a certain threshold and the wavelength-specific figure of merit for each channel-carrying wavelength whose channel is dropped at the respective drop site;

when at least one of the sites that is a drop site has not met the equalization condition:

determining, for each site that is a drop site for at least one channel, a site-specific figure of merit from the wavelength-specific figures of merit for all channel-carrying-wavelengths whose channels are dropped at that drop site; and generating each channel's power adjustment as a function of the wavelength-specific figure of merit for the wavelength containing that channel at that channel's drop site and as a function of the site-specific figure of merit for that channel's drop site.

40. An optical system, comprising:

a main optical path comprising a plurality of sites for carrying a plurality of channels therealong, each channel travelling from a corresponding one of theسites, known as an "add" site for that channel, to a corresponding other one of the sites, known as a "drop" site for that channel, wherein each site which is a drop site for at least one channel has a capability to determine a wavelength-specific figure of merit for each channel-carrying-wavelength whose channel is either dropped at or passing through that site, wherein each site which is an add site for at least one channel has a capability to control the transmit power of each channel for which it is an add site; and an equalizer connected to each site which is an add site for at least one channel and to each site which is a drop site for at least one channel, said equalizer being adapted to a) receive a wavelength-specific figure of merit for each wavelength at each one of the plurality of sites;

b) determine a channel-specific figure of merit for each channel from the wavelength-specific figures of merit for those wavelength/site combinations corresponding to that channel;

c) for each respective site in the plurality of sites, determining whether the respective site has met an equalization condition on a basis of a certain threshold and the channel-specific figure of merit for each channel at the respective site;

d) when at least one of the sites in the plurality of sites has not met the equalization condition, said equalizer is adapted to:
  i) determine a site-specific figure of merit for each site that is a drop site for at least one channel from the wavelength-specific figures of merit associated with that channel's path; and
  ii) generate the power adjustment for each channel in the plurality of channels as a function of the channel-specific figure of merit for that channel at that channel's drop site and as a function of the site-specific figure of merit for that channel's drop site.

* * * * *